(12) United States Patent
Palazzo

(10) Patent No.: US 8,906,549 B1
(45) Date of Patent: Dec. 9, 2014

(54) DEVELOPMENT OF MIXED BINDER SYSTEM FOR PRIMARY CELL CATHODES

(75) Inventor: Marcus Palazzo, Wheatfield, NY (US)

(73) Assignee: Greatbatch Ltd., Clarence, NY (US)

( * ) Notice: Subject to any disclaimer, the term of this patent is extended or adjusted under 35 U.S.C. 154(b) by 574 days.

(21) Appl. No.: 13/241,508

(22) Filed: Sep. 23, 2011

Related U.S. Application Data

(60) Provisional application No. 61/386,252, filed on Sep. 24, 2010.

(51) Int. Cl.
*H01M 4/13* (2010.01)

(52) U.S. Cl.
USPC ........................................ 429/217; 429/231.5

(58) Field of Classification Search
USPC ............................................. 429/217, 231.5
See application file for complete search history.

(56) References Cited

U.S. PATENT DOCUMENTS

| | | | |
|---|---|---|---|
| 4,310,609 A | 1/1982 | Liang et al. | |
| 5,443,928 A | 8/1995 | Takeuchi et al. | |
| 5,472,810 A | 12/1995 | Takeuchi et al. | |
| 5,516,340 A | 5/1996 | Takeuchi et al. | |
| 5,545,497 A * | 8/1996 | Takeuchi et al. | 429/219 |
| 5,571,640 A | 11/1996 | Takeuchi et al. | |
| 6,001,507 A | 12/1999 | Ono et al. | |
| 6,797,019 B2 | 9/2004 | Takeuchi et al. | |
| 7,645,544 B2 | 1/2010 | Ihara et al. | |
| 7,790,312 B2 | 9/2010 | Costello et al. | |
| 2002/0110732 A1* | 8/2002 | Coustier et al. | 429/144 |
| 2004/0062989 A1* | 4/2004 | Ueno et al. | 429/217 |
| 2007/0065728 A1 | 3/2007 | Zhang et al. | |
| 2008/0038643 A1 | 2/2008 | Krehl et al. | |
| 2009/0297952 A1 | 12/2009 | Yasunaga et al. | |
| 2010/0062339 A1 | 3/2010 | Pan et al. | |
| 2010/0167127 A1* | 7/2010 | Cheng et al. | 429/221 |
| 2010/0255372 A1 | 10/2010 | Suguro et al. | |
| 2011/0014521 A1* | 1/2011 | Matsuyama et al. | 429/217 |

FOREIGN PATENT DOCUMENTS

WO   WO 2009112920 A1 *   9/2009

OTHER PUBLICATIONS

Chung, Y.; Cho, W. "Electrochemical Properties of Carbon-Coated Si/B Composite Anode for Lithium Ion Batteries." Journal of Power Sources 2009, 189(1), 108-113.
Guerfi, A.; Kaneko, M.; Petitclerc, M.; Mori, M.; Zaghib, K. "LiFePO4 Water Soluble Binder Electrode for Li-Ion Batteries." Journal of Power Sources 2007, 163(2), 1047-1052.
Weiping, Y.; Jiancai, Q.; Shichae, Z.; Cao, P.; Dong, H. "The Influence of SBR on the Recycling Performances of Co3O4 Negative Electrode in Lithium-Ion Batteries." ECS Transactions 2006, 1(26), 79-85.
Annual Book of ASTM Standards vol. 06.01, D3359, "Test Methods for Measuring Adhesion by Tape Test."

(Continued)

*Primary Examiner* — Zachary Best
(74) *Attorney, Agent, or Firm* — Michael F. Scalise

(57) ABSTRACT

The invention is directed to an SVO electrochemical cell having high rate capability. The cathode is produced by coating a mixture of an active material, conductive additives, a mixed binder, and an aluminum foil current collector. The mixed binder consists of a mixture of styrene butadiene with PVDF. The use of the styrene butadiene maintains adhesion to the conductive current collector while the PVDF portion of the binder gives flexibility. A particularly preferred couple is of a lithium/silver vanadium oxide (Li/SVO) chemistry and the binder mixture enables an active slurry of SVO to be coated onto a current collector without delamination.

29 Claims, 3 Drawing Sheets

(56) References Cited

OTHER PUBLICATIONS

Annual Book of ASTM Standards vol. 02.05, B571, "Qualitative Adhesion testing of Metallic Coatings."

Annual Book of ASTM Standards vol. 01.05, B905, "Assessing the Adhesion of Metallic and Inorganic Coatings by the Mechanized Tape Test."

* cited by examiner

DEVELOPMENT OF MIXED BINDER SYSTEM FOR PRIMARY CELL CATHODES

CROSS-REFERENCE TO RELATED APPLICATION

The present application claims priority from U.S. Provisional Application Ser. No. 61/386,252 filed Sep. 24, 2010.

BACKGROUND OF THE INVENTION

1. Field of the Invention

The present invention relates to the conversion of chemical energy to electrical energy and, more particularly, to a cathode of silver vanadium oxide (SVO) admixed with a combination of polymeric binders. Importantly, the silver vanadium oxide admixture is coated to a current collector for incorporation into an electrochemical cell. The preferred binder formulation is a mixture of a halogenated polymeric binder and a butadiene rubber, most preferably polyvinylidene fluoride (PVDF) and a styrene butadiene rubber (SBR).

2. Prior Art

Halogenated polymeric materials have been used extensively as binders for electrodes in all types of nonaqueous electrochemical cells, and particularly lithium cells. For example, polyvinylidene fluoride is a material that functions well as an electrode active binder at or near ambient temperature. PVDF is generally stable in various electrochemical cell electrolytes. The addition of PVDF has been known to increase electrode flexibility as well as enable an acceptable pulse performance of the resulting electrochemical cell. However, the addition of PVDF generally provides little to no cathode material adhesion in conjunction with SVO active material. Thus, SVO cells manufactured with PVDF as the sole binder material cannot be used for direct current collector coating processes because of the material's lack of cathode material adhesion. Such an electrode produced with PVDF as a sole binder generally results in delaminated electrodes.

It is also known in the prior art to employ non-halogenated polymeric materials as binders in nonaqueous, alkali metal electrochemical cells. Exemplary is U.S. Pat. No. 5,468,571 to Asami et al. which discloses that polyimide (PI) is useful as an anode binder in lithium secondary cells. Electrodes containing such non-halogenated polymers as the sole binder material are somewhat brittle and have a tendency to crack.

U.S. Pat. No. 6,797,019 to Takeuchi et al., which is assigned to the assignee of the present invention and incorporated by reference herein, describes a process for manufacturing a cathode component prepared from a mixture of a soluble polyimide and PVDF combined with an active material such as silver vanadium oxide (SVO). As compared to the electrochemical cells disclosed in U.S. Pat. Nos. 6,001,507 and 5,571,640, this process provided an electrochemical cell with improved discharge efficiency, especially during pulsing. The mixture of polyimide and PVDF increased adhesion of the SVO active cathode material to the current collector. Furthermore, the addition of the PVDF improved flexibility of the cathode as the polyimide constituent is relatively brittle. However, the addition of the polyimide constituent requires a heat curing process. This heat curing process adds an additional manufacturing processing step that undesirably adds cost and complexity to the manufacturing process of the electrochemical cell. In addition, it has been demonstrated that under certain conditions, the heat curing process decreases the voltage output of the electrochemical cell over a period of time. This reduction in voltage output may be brought about by an undesirable reaction, which affects the chemical structure of the SVO material. Furthermore, it is believed that the heat curing process may also result in an undesirable increase in internal electrical resistance.

Therefore, there is a need for a binder formulation that provides flexibility and direct cathode material to substrate adhesion that does not result in an increase in internal electrical resistance and voltage output degradation of the electrochemical cell. As will, be described in detail hereinafter, coating a slurry of electrode active material, particularly of silver vanadium oxide, to a current collector results in improved performance characteristics in comparison to the prior art techniques. This improvement is believed to be directly attributable to the novel binder mixture.

SUMMARY OF THE INVENTION

The present invention is, therefore, directed to an electrode built of an active material including a mixture of two polymeric binders useful in nonaqueous organic electrolytes activating alkali metal or alkali metal ion electrochemical cells, and a method that provides flexible, non-brittle electrodes, particularly of silver vanadium oxide. The first binder is preferably a halogenated polymeric binder and, more preferably, a fluorinated polymeric material, such as polyvinylidene fluoride(PVDF). The second binder is preferably a butadiene rubber, more preferably, a styrene butadiene rubber (SBR). A preferred binder mixture is PVDF and SBR.

To construct an electrode, silver vanadium oxide and possibly, a conductive diluent, are combined with a mixture of butadiene rubber and PVDF binder materials, and a mixture of organic solvents. The constituents are first combined into a slurry and then coated on to a current collector. Once dried, this electrode assembly is then incorporated into an electrochemical cell.

These and other aspects of the present invention will become increasingly more apparent to those of ordinary skill in the art by reference to the following description taken in conjunction with the accompanying drawings.

DETAILED DESCRIPTION OF THE PREFERRED EMBODIMENTS

Figure 1:
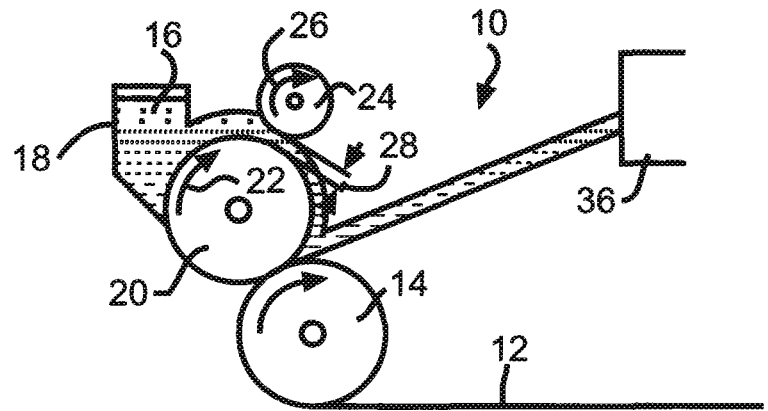
FIG. 1 is a schematic of an electrode active slurry being roll coated onto a current collector according to the present invention.

As used herein, the term "pulse" means a short burst of electrical current of a significantly greater amplitude than that of a pre-pulse current immediately prior to the pulse. A pulse train consists of at least two pulses of electrical current delivered in relatively short succession with or without open circuit rest between the pulses. An exemplary pulse train may consist of four 10 second pulses with a 15 second rest between each pulse.

The present invention is directed to the fabrication of electrodes for use in primary and secondary electrochemical cells, without diminished discharge performance in comparison to cells of a similar active chemistry. For that purpose, the electrode active material is intimately combined with a binder mixture consisting of a first, halogenated polymeric constituent and a second, butadiene rubber (BR) to form an electrode active admixture. Preferably, the active mixture is coated on a conductive current collector prior to the incorporation within an electrochemical cell.

Halogenated polymeric materials suitable as the first binder constituent are preferably fluorinated resins, for example, polytetrafluoroethylene, modified polytetrafluoroethylene, polyhexafluoropropylene, tetrafluoroethylene-hexafluoropropylene copolymers, tetrafluoroethylene-perfluoroalkyl vinyl ether copolymers, polytrifluoroethylene, ethylene-tetrafluoroethylene copolymers, fluoroethylene-hydrocarbon vinyl ether copolymers, polychlorotrifluoroethylene, ethylene-chlorotrifluoroethylene copolymers, polyvinyl fluoride, polyvinylidene fluoride (PVDF), vinylidene fluoride-hexafluoropropylene copolymers, fluorinated (meth) acrylate resins, 2-fluoroacrylate resins, fluorinated epoxy resins, fluorinated epoxy(meth)acrylate resins, fluorinated polyether resins, fluorinated polyimide resins, fluorinated polyester resins, fluorinated polyamide resins, fluorinated polycarbonate resins, fluorinated polyformal resins, fluorinated polyketone resins, fluorinated polyazomethine resins, fluorinated polyazole resins, and fluorinated polyallyloxysilane resins. The first binder constituent can also be a fluorinated elastomer such as vinylidene fluoride-hexafluoropropylene fluoroelastomer, vinylidene fluoride-tetrafluoroethylene fluoroelastomer, tetrafluoroethylene-perfluoroalkyl vinyl ether fluoroelastomer, vinylidene fluoride-tetrafluoroethylenehexafluoropropylene fluoroelastomer, vinylidene fluoride-tetrafluoroethylene-perfluoroalkyl vinyl ether fluoroelastomer, tetrafluoroethylene-perfluoroalkyl vinyl ether fluoroelastomer, propylene-tetrafluoroethylene fluoroelastomer, fluorosilicone rubber, fluorinated phosphazene rubber, fluorinated thermoplastic rubbers, and flexible fluorocarbon resins. Any one of the fluorinated resins and fluorinated elastomers are suitable as the first, halogenated polymeric constituent when used alone or in mixtures thereof.

The second binder constituent is a butadiene rubber as a synthetic rubber having the general chemical formula, $C_4H_6$. In particular, the butadiene rubber may comprise nitrile butadiene rubber, acrylonitrile butadiene rubber and more preferably styrene butadiene rubber. Styrene butadiene rubber may be of an emulsified or a solution derived styrene butadiene. The styrene content within the butadiene material may range from about 5% to about 50%. It is preferred that the SBR constituent have a styrene content of about 30 weight percent that may be obtained from Sigma Aldrich of St. Louis Mo.

The content of the fluorinated polymer is not particularly limited, but is preferably at least 20%, by weight, of the mixture of the first and second binders. Less than 20% by weight of the fluorinated polymer constituent results in insufficient cohesion of the electrode active material during electrode fabrication and assembly of the cell, and during charge/discharge cycling.

A typical electrode for a nonaqueous, alkali metal electrochemical cell is made from a mixture of 80 to 95 weight percent of an electrode active material, 1 to 10 weight percent of an organic solvent mixture and 3 to 25 weight percent of a mixture of the polymeric binders according to the present invention comprising the first, halogenated polymeric constituent and the second, styrene butadiene constituent. A conductive diluent at a weight percent ranging from about 1 to about 10 may also be incorporated in the cathode active slurry formulation. Suitable conductive diluents include acetylene black, carbon black, and/or graphite. Metals such as stainless steel in powder form are useful as conductive diluents.

Both the first and second binders are preferably provided in a powdered form. A first binder mixture comprising the halogenated polymeric material, specifically polyvinylidene fluoride (PVDF) and a polar organic solvent such as triethyl phosphate is created. In a preferred embodiment, from about 1 to about 15 weight percent PVDF binder is mixed together with the triethyl phosphate (TEP) solvent. The first binder mixture is created by mixing the first binder with the solvent at a low shear rate of about 400 RPM from about 5 to 15 minutes. The slow shear rate ensures thorough dilution and suspension of the binder within the solvent.

A second binder mixture comprising the styrene butadiene binder material and a non-polar organic solvent, such as toluene is created. In a preferred embodiment, from about 1 to about 15 weight percent SBR binder is mixed together with the toluene solvent. The second binder mixture is created by mixing the second binder with the solvent at a low shear rate of about 400 RPM from about 5 to 15 minutes followed by the application an increased shear rate of about 700 RPM for about 20 minutes. The application of multiple shear rates ensures a thoroughly mixed binder solution.

After the first and second binder solutions are formulated, a binder slurry comprising the combination of the first and second binder mixtures is prepared. In a preferred embodiment, the first binder solution is mixed with the second binder solution in a weight ratio ranging from about 1:10 to about 10:1.

The above described binder mixtures are generally used by dissolving or dispersing the materials in respective powder and liquid acidic forms in a solvent. Other suitable solvents may include water, methyl ethyl ketone, cyclohexanone, triethyl phosphate (TEP), isophoron, N-methyl-2-pyrrolidone (NMP), N,N-dimethylformamide, N,N-dimethylacetamide, toluene, and mixtures thereof. The binder materials may sometimes be used without a solvent.

The most preferred binder formulation according to the present invention comprises a mixture of polyvinylidene fluoride (PVDF) as the first binder constituent and styrene butadiene (SBR) as the second binder constituent. The preferred binder composition ranges from, by weight, about 1% PVDF:99% SBR to about 99% PVDF:1% SBR with a more preferred composition ranging from about 40% PVDF:60% SBR to about 60% PVDF:40% SBR, and most preferably about 50% PVDF to about 50% SBR.

FIG. 1 is a schematic of a roll coating assembly according to one preferred method of coating an electrode active mixture onto a current collector 12. The current collector is of a conductive material such as of a titanium, aluminum, nickel, stainless steel, or copper foil or expanded screen or grid provided in bulk rolled up on an unwind roller 14. The active slurry 16 including the present binder mixture is contained in a weep tray 18 provided in a fluid flow communication with an application roller 20 rotating in a clockwise direction, as indicated by arrow 22. To regulate the thickness of the slurry laid down onto the unwinding current collector 12, the application roller rotates in conjunction with a metering roller 24, also rotating in a clockwise direction as indicated by arrow 26. The metering roller 24 is spaced from the application roller 20 by a gap, indicated by arrows 28, set at the desired thickness of the active coating on the current collector 12. This gap is adjustable. The electrode active coating preferably has a thickness in the range of from about 0.001 inches to about 0.05 inches. Once the slurry is laid down onto the current collector 12, the coated current collector may be advanced through a drying oven 36. Alternatively, the coated current collector 12 may be air-dried.

Figure 2:
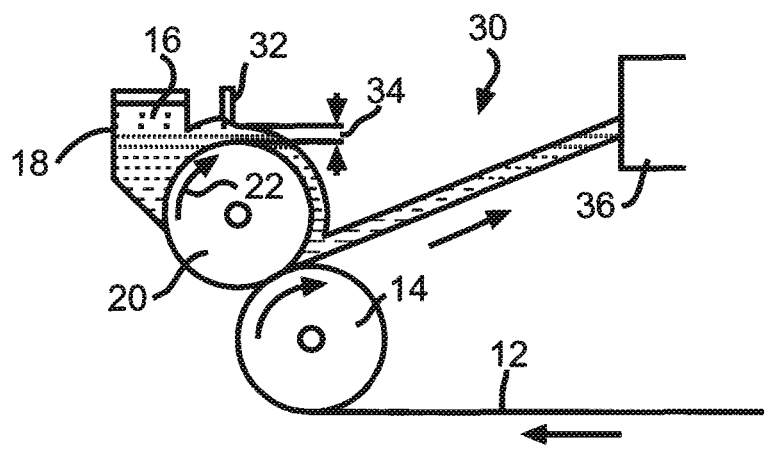
FIG. 2 is a schematic of an electrode active slurry being coated onto a current collector using a doctor blade according to the present invention.

FIG. 2 shows another preferred assembly 30 for coating an active slurry onto the current collector 12 playing out from the unwind roller 14. This method is similar to that shown in FIG. 1 except that the thickness of the active slurry 16 laid down on the unwinding current collector is accomplished in a different manner. Instead of a metering roller, a doctor blade 32 is use. The doctor blade 32 is spaced from the application roller 20 by a gap, indicated by arrow 34, set at the desired thickness of the active slurry coating on the current collector 12. This gap between the doctor blade 32 and the application roller 12 is adjustable to provide the electrode active coating preferably having a thickness in the range of from about 0.001 inches to about 0.05 inches.

Another embodiment of the present invention for coating the active slurry 16 on the current collector 12 is termed a "knife over roll" technique. This technique is similar to that shown in FIG. 2, but does not include the current collector 12 rounding an unwind roller separate from the application roller. Instead, the current collector unfurls from an unwind roller spaced from the doctor blade by a gap directly related to the intended thickness of the slurry coating on the current collector. The knife over roll technique eliminates the unwind roller 14 from the assembly of FIG. 2.

If desired, the active coating is layered on both sides of a perforated current collector with an intermediate drying step. This serves to lock the active material together through openings provided in the intermediate grid. The final thickness of the electrode laminate is in the range of about 0.003 to about 0.1 inches.

An electrochemical cell constructed according to the present invention, whether of a primary or a secondary chemistry, includes an anode active material selected from Groups IA, IIA, or IIIB of the Periodic Table of Elements, including lithium, sodium, potassium, etc., and their alloys and intermetallic compounds including, for example Li—Si, Li—B, Li—Mg, and Li—Si—B alloys and intermetallic compounds. The preferred anode active material comprises lithium. For a primary cell, the preferred anode comprises a lithium alloy, the preferred lithium alloy being a lithium-aluminum alloy. The greater the amount of aluminum present by weight in the alloy, however, the lower the energy density of the cell.

In secondary electrochemical systems, a carbonaceous negative electrode is preferred. The carbon comprises any of the various forms of carbon (e.g., coke, graphite, acetylene black, carbon black, etc.) which are capable of reversibly retaining the lithium species. Graphite is preferred due to its relatively high lithium-retention capacity. Carbon fibers are particularly advantageous because they have excellent mechanical properties which permit them to be fabricated into rigid electrodes that are capable of withstanding degradation during repeated charge-discharge cycling. Moreover, their high surface area allows rapid charge/discharge rates. The carbon may be contacted to a conductive substrate such as by pressing, bonding, and the like. A preferred carbonaceous material for the negative electrode of a secondary electrochemical cell is described in U.S. Pat. No. 5,443,928 to Takeuchi et al., which is assigned to the assignee of the present invention and incorporated herein by reference.

A typical secondary cell negative electrode is fabricated by mixing about 90 to 97 weight percent graphite with 3 to 10 weight percent of the present invention mixture of a first, halogenated polymeric binder and a second, styrene butadiene rubber. This electrode active admixture is a viscous slurry which is coated onto a current collector such as a titanium, aluminum, nickel, stainless steel, or copper foil or screen according to the prior described FIGS. 1 and 2.

The form of the anode or negative electrode may vary. For example, in a primary cell the anode is preferably a thin metal sheet or foil of the anode metal, pressed or rolled on a metallic anode current collector, i.e., preferably comprising nickel. The anode component further has an extended tab or lead of the same material as the anode current collector, i.e., preferably nickel, integrally formed therewith such as by welding and contacted by a weld to a cell case of conductive metal in a case-negative electrical configuration. Alternatively, the anode may be formed in some other geometry, such as a bobbin shape, cylinder or pellet to allow an alternate low surface cell design.

The cathode or positive electrode of both a primary and a secondary cell is preferably of a solid, lithium retention material and the electrochemical reaction at the cathode involves conversion of ions which migrate from the anode to the cathode in atomic or molecular forms. The solid cathode material may comprise a metal, a metal oxide, a mixed metal oxide, a metal sulfide or a carbonaceous compound, and combinations thereof.

One preferred mixed metal oxide useful as the cathode of a primary cell has the general formula $SM_xV_2O_y$, wherein SM is a metal selected from Groups IB to VIIB and VIII of the Periodic Table of Elements, and wherein x is about 0.30 to 2.0 and y is about 4.5 to 6.0 in the general formula. For a more detailed description of such a cathode active material, reference is made to U.S. Pat. No. 4,310,609 to Liang et al., which is assigned to the assignee of the present invention and incorporated herein by reference. Another preferred composite cathode active material for primary cells has the general formula $Cu_xAg_yV_2O_z$, (CSVO) and the range of material compositions is preferably about $0.01 \leq x \leq 1.0$, about $0.01 \leq y \leq 1.0$ and about $5.01 \leq z \leq 6.5$. For a more detailed description of this cathode active material, reference is made to U.S. Pat. No. 5,472,810 to Takeuchi et al. and U.S. Pat. No. 5,516,340 to Takeuchi et al., both of which are assigned to the assignee of the present invention and incorporated herein by reference. For a silver vanadium oxide or copper silver vanadium oxide cathode, the current collector is preferably of aluminum or titanium, the latter being preferred.

One preferred electrochemical couple is of a lithium/silver vanadium oxide chemistry. In that case, the cathode is formed by adding a PVDF/solvent slurry mixture to a styrene butadiene/solvent slurry. This slurry is stirred to create a low viscosity mixture. Separately, dry SVO is milled with conductive additives to create a homogeneous mixture that is then mixed with the diluted binder slurry causing uniform coating of the SVO with the binder materials. As previously described, the slurry is then coated onto a current collector as shown in FIGS. 1 and 2.

Other cathode active materials useful for fabrication of primary cells include manganese dioxide, copper vanadium oxide, titanium disulfide, copper oxide, copper sulfide, iron sulfide, iron disulfide, fluorinated carbon, and mixtures thereof. Preferably, the cathode comprises from about 80 to about 99 weight percent of the cathode active material.

Additionally, a primary electrochemical cell can comprise a liquid depolarizer/catholyte, such as sulfur dioxide or oxyhalides including phosphoryl chloride, thionyl chloride and sulfuryl chloride used individually or in combination with each other or in combination with halogens and interhalogens, such as bromine trifluoride, or other electrochemical promoters or stabilizers. This type of cell requires a carbonaceous cathode current collector containing a binder mixture according to the present invention.

In secondary cells, the cathode preferably comprises a lithiated material that is stable in air and readily handled. Examples of such air-stable lithiated cathode materials include oxides, sulfides, selenides, and tellurides of such metals as vanadium, titanium, chromium, copper, molybdenum, niobium, iron, nickel, cobalt and manganese. The more preferred oxides include $LiNiO_2$, $LiMn_2O_4$, $LiCoO_2$, $LiCo_{0.92}Sn_{0.08}O_2$ and $LiCo_{1-x}Ni_xO_2$.

To discharge such secondary cells, the lithium metal comprising the positive electrode is intercalated into the carbonaceous negative electrode by applying an externally generated electrical potential to recharge the cell. The applied recharging electrical potential serves to draw the alkali metal ions from the cathode active material, through the electrolyte and into the carbonaceous anode material comprising the negative electrode. The cell is then provided with an electrical potential and discharged in a normal manner.

An alternate secondary cell construction comprises intercalating the carbonaceous material with the active alkali material before the anode is incorporated into the cell. In this case, the cathode body can be solid and comprise, but not be limited to, such materials as manganese dioxide, silver vanadium oxide, titanium disulfide, copper oxide, copper sulfide, iron sulfide, iron disulfide and fluorinated carbon. This approach is compromised by the problems associated with handling lithiated carbon outside of the cell. Lithiated carbon tends to react with explosive results when contacted by air. However, since these materials do not contain lithium ions, they are useful active materials with the present binder mixture.

Whether the cell is constructed as a primary or secondary electrochemical system, a separator is provided to physically segregate the anode and cathode active electrodes. The separator is of an electrically insulative material to prevent an internal electrical short circuit between the electrodes, and the separator material also is chemically unreactive with the anode and cathode active materials and both chemically unreactive with and insoluble in the electrolyte. In addition, the separator material has a degree of porosity sufficient to allow flow therethrough of the electrolyte during the electrochemical reaction of the cell. The form of the separator typically is a sheet which is placed between the anode and cathode electrodes. Such is the case when the anode is folded in a serpentine-like structure with a plurality of cathode plates disposed intermediate the anode folds and received in a cell casing or when the electrode combination is rolled or otherwise formed into a cylindrical "jellyroll" configuration.

Suitable nonaqueous electrolytes comprise an inorganic salt dissolved in a nonaqueous solvent, and more preferably an alkali metal salt dissolved in a mixture of aprotic organic solvents comprising a low viscosity solvent including organic esters, ethers and dialkyl carbonates, and mixtures thereof, and a high permittivity solvent including cyclic carbonates, cyclic esters and cyclic amides, and mixtures thereof. Suitable nonaqueous solvents are substantially inert to the anode and cathode electrode materials and preferred low viscosity solvents include tetrahydrofuran (THF), methyl acetate (MA), diglyme, triglyme, tetraglyme, dimethyl carbonate (DMC), diethyl carbonate (DEC), dipropyl carbonate (DPC), methyl ethyl carbonate (MEC), methyl propyl carbonate (MPC), ethyl propyl carbonate (EPC), 1,2-dimethoxyethane (DME), and mixtures thereof. Preferred high permittivity solvents include propylene carbonate (PC), ethylene carbonate (EC), butylene carbonate (BC), acetonitrile, dimethyl sulfoxide, dimethyl formamide, dimethyl acetamide, γ-butyrolactone (GBL), γ-valerolactone, N-methyl-pyrrolidinone (NMP), and mixtures thereof.

Known lithium salts that are useful as a vehicle for transport of alkali metal ions from the anode to the cathode, and back again include $LiPF_6$, $LiBF_4$, $LiAsF_6$, $LiSbF_6$, $LiClO_4$, $LiAlCl_4$, $LiGaCl_4$, $LiC(SO_2CF_3)_3$, $LiO_2$, $LiNO_3$, $LiO_2CCF_3$, $LiN(SO_2\ CF_3)_2$, $LiSCN$, $LiO_3SCF_2CF_3$, $LiC_6F_5SO_3$, $LiO_2CF_3$, $LiSO_3F$, $LiB(C_6H_5)_4$, $LiCF_3SO_3$, and mixtures thereof. Suitable salt concentrations typically range between about 0.8 to 1.5 molar.

The assembly of the cells described herein is preferably in the form of a wound element configuration. That is, the fabricated negative electrode, positive electrode and separator are wound together in a "jellyroll" type configuration or "wound element cell stack" such that the negative electrode is on the outside of the roll to make electrical contact with the cell case in a case-negative configuration. Using suitable top and bottom insulators, the wound cell stack is inserted into a metallic case of a suitable size dimension. The metallic case may comprise materials such as stainless steel, mild steel, nickel-plated mild steel, titanium, tantalum or aluminum, but not limited thereto, so long as the metallic material is compatible for use with the other cell components.

The cell header comprises a metallic disc-shaped body with a first hole to accommodate a glass-to-metal seal/terminal pin feedthrough and a second hole for electrolyte filling. The glass used is of a corrosion resistant type having up to about 50% by weight silicon such as CABAL 12, TA 23, FUSITE 425 or FUSITE 435. The positive terminal pin feedthrough preferably comprises titanium although molybdenum, aluminum, nickel alloy, or stainless steel can also be used. The cell header is typically of a material similar to that of the case. The positive terminal pin supported in the glass-to-metal seal is, in turn, supported by the header, which is welded to the case containing the electrode stack. The cell is thereafter filled with the electrolyte solution described hereinabove and hermetically sealed such as by close-welding a stainless steel ball over the fill hole, but not limited thereto.

The following examples describe the manner and process of an electrochemical cell according to the present invention, and they set forth the best mode contemplated by the inventors of carrying out the invention, but they are not to be construed as limiting.

Test Cell Preparation

A first set of five test cells (Group I) were constructed, each having a cathode prepared according to the prior art process described in U.S. Pat. No. 6,797,019 to Takeuchi et al. Each of the cathode current collectors were built with a cathode comprising a binder slurry of, by weight, 4% polyamic acid/1% PVDF in NMP having a concentration of 8% solids. The slurry was mixed at low shear for 15 minutes. A powder mixture consisting essentially of, by weight, 91% SVO and 5% carbonaceous diluent was dry milled until a homogenous mixture was obtained. The milled solids were then added to the previously prepared binder slurry with a second low shear mixing step for ten minutes. The resulting active slurry was coated onto an aluminum foil using either a roll coating method or a doctor blade. Upon drying, the resulting cathodes were heat cured according to the following protocol: about 140° C. for about 30 minutes, then about 200° C. for about 30 minutes, and finally about 350° C. for about one hour. These cathodes were then coupled with a lithium anode and activated by an electrolyte comprising $LiAsF_6$ dissolved in a solvent system of, by volume, 50:50 PC:DME.

A second set of four test cells (Group II) were constructed according to the process of the present invention. The cathode current collectors were built, each having a cathode comprising a binder slurry of, by weight, 5% PVDF/5% SER in a solvent mixture having a volume ratio of 1:10 toluene to TEP solvent solution. The binder slurry was mixed at low shear for 15 minutes. A powder mixture consisting essentially of, by weight, 97% SVO and 3% carbonaceous diluent was dry milled until a homogenous mixture was obtained. The milled solids were then added to the previously prepared binder slurry with a second low shear mixing step for ten minutes. The resulting active slurry was coated onto an aluminum foil using either a roll coating method or a doctor blade. The coated aluminum foil was then placed in a drying chamber at about 100° C. until the electrode surface was dried. These cathodes were then coupled with a lithium anode and activated by an electrolyte comprising $LiAsF_6$ dissolved in a solvent system of, by volume, 50:50 PC:DME.

A third set of control group test cells were built, each having a cathode prepared according to the prior art sheet process described in U.S. Pat. No. 5,571,640 to Takeuchi et al., assigned to the assignee of the present invention, and incorporated herein by reference. The control group test cells have cathodes comprised of an SVO active material and a binder of polytetrafluoroethylene. More specifically, the cathode of the control group cells consisted essentially of, by weight, 94% SVO 3% carbonaceous diluent, and 3% PTFE binder. These cathodes were then coupled with a lithium anode and activated by an electrolyte comprising $LiAsF_6$ dissolved in a solvent system of, by volume, 50:50 PC:DME.

Electrochemical Testing of Cells

The cells of test Groups I and II as well as the cells of the control group were pulse discharged, during which their voltage outputs were recorded as a function of percent depth of discharge (DOD). A current having a current density expressed in terms of active cathode surface area was applied to the Group I, Group II and control group cells. A pulse train, comprising a series of four separate current pulses, was applied to each of the sampling of cells comprising Group I, Group II and the control group. Each current pulse of the train was applied for about 10 seconds with about a 15 second time period between the four pulses. After application of the fourth current pulse, the cells were then rested under a light background load. After this rest period, the pulse train was again, applied to the cells. This pulse train and rest sequence was repeated until the electrical energy within each of the cells was depleted. The voltage output, expressed in millivolts, of the cells of Groups I and II and the control group was monitored and recorded continuously during the pulse discharge testing process.

Figure 3:
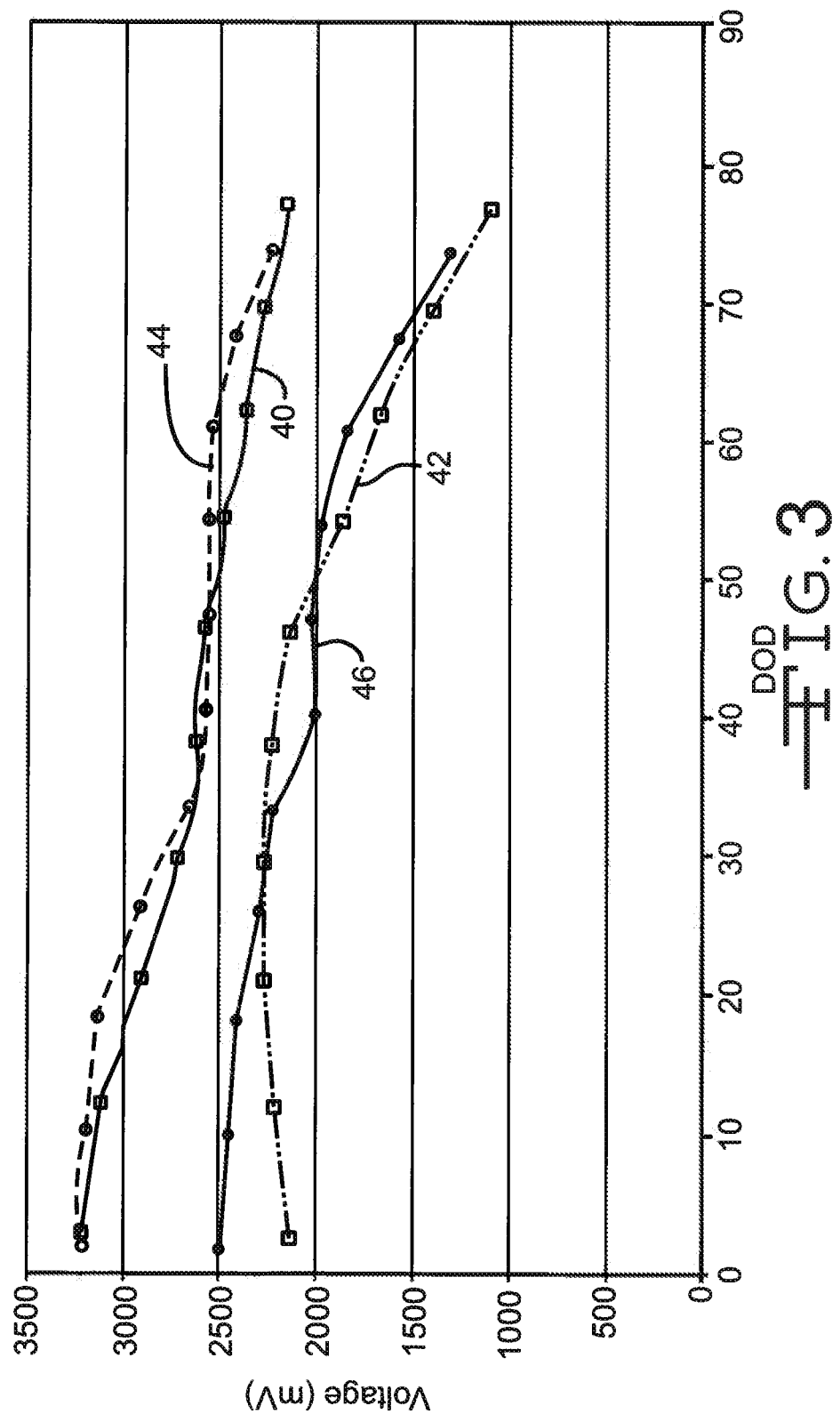
FIG. 3 is a graph illustrating the pulse discharge characteristics of a representative Li/SVO cell according to the prior art in comparison to a control Li/SVO cell.

FIG. 3 graphically illustrates the results of a first pulse discharge test in which five of the Group I cells were tested in comparison to five of the control group cells over an extended period of five years. A current density of about 20 mA per $cm^2$ of active cathode surface area was applied to generate the pulse discharge data illustrated in the figure. Each of the Group I and control group cells were pulsed with consecutive pulse trains comprising of four 10 second pulses with a 15 second interval between each pulse. A rest period of approximately 150 days separates each of the applied pulse trains.

In particular, curves 40 and 42 are respective of the prepulse and pulse 4 minima voltage output of the representative Group I cells. Curves 44 and 46 are similar prepulse and pulse 4 minima voltages measured outputs of the control group cells. As shown in the graph, the control group cells generally exhibit a higher prepulse voltage output as compared to the prepulse voltage output of the Group I cells, particularly at depth of discharges ranging from about 10 percent to about 25 percent and from about 55 percent to about 75 percent. This data indicates that as the electrical energy of the Group I cell is depleted, the prepulse voltage of the Group I cells on average is slightly less than the average of the control group cells. A decreased prepulse voltage output is generally not desired. It is believed that this decrease in prepulse voltage output characterized by the Group I cells, is a result of the binder heat curing process.

Figure 4:
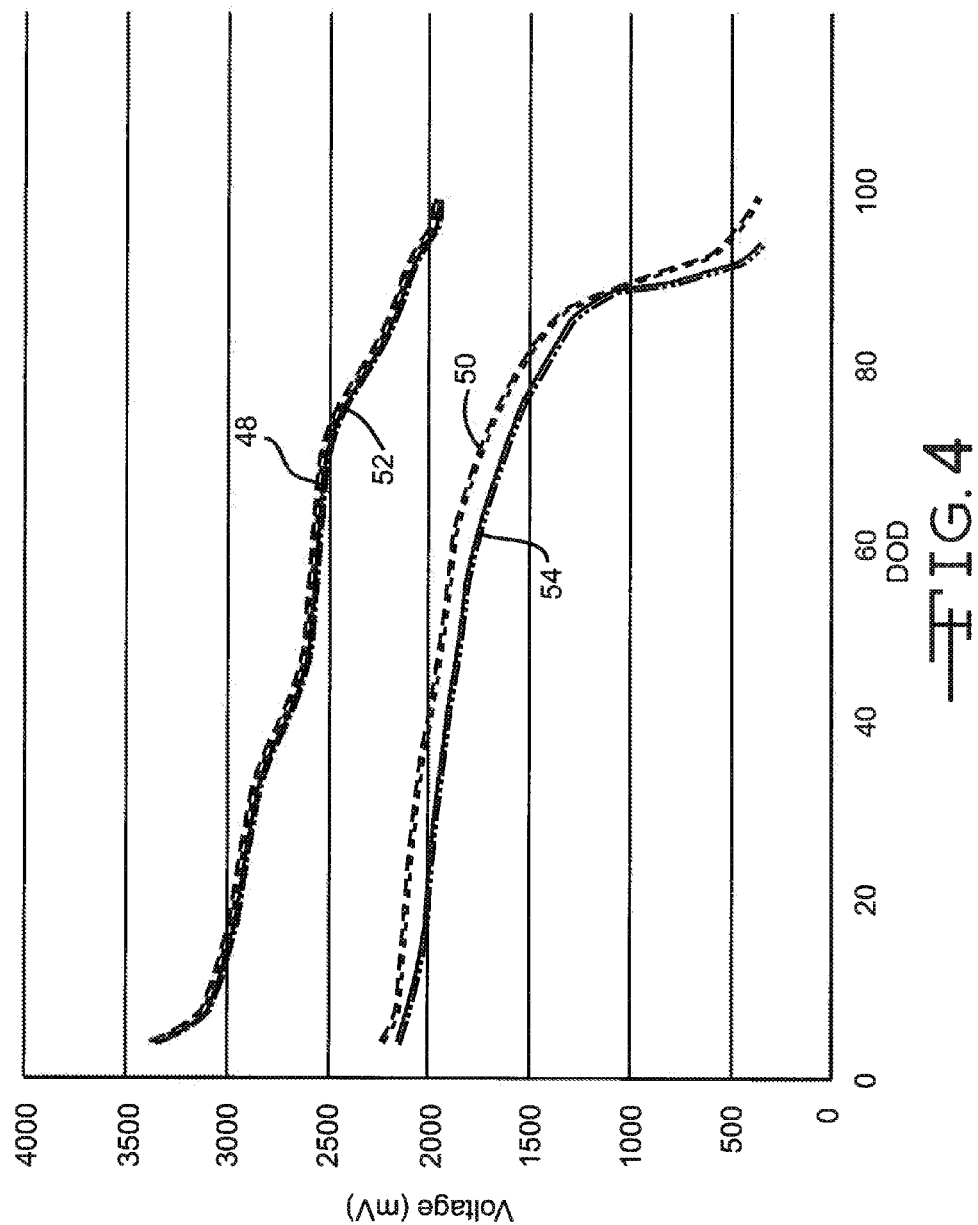
FIG. 4 is a graph comparing the pulse discharge characteristics of a representative Li/SVO cell according to the present invention in comparison to a control Li/SVO cell.

FIG. 4 graphically illustrates the results of a second pulse discharge test in which four of the Group II cells were tested in comparison to four of the control group cells over an accelerated period of one week. In addition to the accelerated time frame, a current density of about 35 mA per $cm^2$ of active cathode surface area was applied to the respective cells. Similar to the pulse discharge data of FIG. 3, a pulse train comprising four 10 second pulses with a 15 second time interval between each pulse was continuously applied to the Group II and control group cells. However, unlike the pulse discharge data shown in FIG. 3, a rest time interval of about 30 minutes separates the application of each of the pulse trains Curves 48 and 50 are representative of the respective prepulse and the pulse 4 minima voltage outputs of the Group II cells and curves 52 and 54 are similar curves of the control group cells.

TABLE I

| DOD (%) | Control Prepulse (mv) | Group I Prepulse (mV) | Control P4 min (mV) | Group I P4 min (mV) | Prepulse Percent Difference | P4 min Percent Difference |
|---|---|---|---|---|---|---|
| 10 | 3192 | 3125 | 2453 | 2218 | 2.1% | 9.6% |
| 20 | 3128 | 2910 | 2410 | 2270 | 7.0% | 5.8% |
| 30 | 2655 | 2723 | 2225 | 2268 | −2.5% | −2.0% |
| 40 | 2575 | 2623 | 2015 | 2232 | −1.9% | −10.8% |
| 50 | 2562 | 2478 | 2029 | 1880 | 3.3% | 7.3% |
| 60 | 2529 | 2364 | 1855 | 1688 | 6.5% | 9.0% |
| 70 | 2416 | 6666 | 1592 | 1414 | 6.2% | 11.2% |

TABLE II

| DOD (%) | Control Prepulse (mV) | Group II Prepulse (mV) | Control P4 min (mV) | Group II P4 min (mV) | Prepulse Percent Difference | P4 min Percent Difference |
|---|---|---|---|---|---|---|
| 10 | 3024 | 3052 | 2061 | 2125 | −0.9% | −3.1% |
| 20 | 2949 | 2937 | 2016 | 2087 | 0.4% | −3.5% |
| 30 | 2886 | 2881 | 1977 | 2061 | 0.2% | −4.3% |
| 40 | 2764 | 2720 | 1927 | 1994 | 1.6% | −3.5% |
| 50 | 2593 | 2597 | 1848 | 1939 | −0.2% | −4.9% |
| 60 | 2562 | 2555 | 1781 | 1870 | 0.3% | −5.0% |
| 70 | 2505 | 2513 | 1607 | 1754 | −0.3% | −9.2% |
| 80 | 2347 | 2321 | 1442 | 1529 | 1.1% | −6.0% |
| 90 | 2157 | 2145 | 1002 | 1106 | 0.6% | −10.3% |

Tables I and II above show the average measured voltage readings for the respective first and second pulse discharge tests comparing Groups I and II to the control group cells. As shown in the first discharge test results of Table I, the magnitude of the difference between the control group and Group I prepulse voltage is generally greater than the magnitude of the difference between the control group and Group II prepulse voltage as shown by the respective prepulse percent difference columns. The prepulse percent difference values were calculated by dividing the difference between the average of the control group measurements from the average of the test cell measurements, either Group I or Group II, then dividing the remainder by the control group value.

Similarly, the average measured pulsed voltages (P4 min) of the Control Group was generally greater than the measured P4 min pulsed voltages of the Group I cells in the first test as shown by the positive calculated P4 min percent difference values. As the data is shown in Table II, the measured P4 min pulsed voltages of the Group II cells were greater than the P4 min pulsed voltages of the control group. Respective P4 min percent difference values were calculated by subtracting the Group I or Group II measurement from the control group then dividing the remainder by the control group measurement to generate the percent difference values.

The results demonstrate that even with a greater current loading of about 175% and a more accelerated pulse discharge test regimen, one week vs. 5 years, the prepulse voltage of the Group II cells was about the same as the prepulse voltage of the control group cells. Therefore, since the prepulse measurements of the Group II cells were generally better than the Group I cells in comparison to the control cells of similar construction, the binder mixture of the present invention, provided an improved prepulse voltage performance than the cells comprising the prior binder mixture of PVDF and polyimide.

Furthermore, the pulse discharge curves of FIG. 3 and Table I data illustrate areas at which, the pulse voltage of the control group cells is greater than that of the Group I cells. Of particular interest as previously mentioned, is the slightly increased pulse 4 minima voltage of the control group cells in comparison to the Group I cells during the initial 10 percent discharge depth and between about 50 to about 60 percent depth of discharge. In comparison, as illustrated in FIG. 4 and shown in Table II, the Group II cells generally have an increased pulsed voltage output as compared to the control group cells throughout the entire depth of discharge. This reduction in pulsed voltage characterized by the Group I cells in comparison to the control cells is not desirable as it indicates that the since Group I cells generally have an increased internal resistance. Since the difference between the Group I and Group II cells is the cathode binder formulation, it is believed that PVDF/PI binder mixture, particularly that of the heat curing process results in the construction of electrochemical cells with an undesirable increased internal electrical resistance.

It is intended that the foregoing description and example only be illustrative of the present invention and that the present invention is limited only by the following appended claims.

What is claimed is:

1. A method for providing an electrochemical cell, comprising the steps of:
   a) providing an anode of an alkali metal;
   b) providing a cathode of a cathode active material selected from the group consisting of:
      i) a first electrode active material having the general formula $SM_xV_2O_y$, wherein SM is a metal selected from Groups IB to VIIB and VIII of the Periodic Table of Elements, and wherein x is about 0.30 to 2.0 and y is about 4.5 to 6.0 in the general formula; and
      ii) a second electrode active material having the general formula $Cu_xAg_yV_2O_z$, wherein about $0.01 \leq x \leq 1.0$, about $0.01 \leq y \leq 1.0$ and about $5.01 \leq z \leq 6.5$;
   c) providing a binder mixture, comprising the steps of:
      i) selecting a first, halogenated polymeric binder from the group consisting of tetrafluoroethylene-perfluoroalkyl vinyl ether copolymers, polytrifluoroethylene, fluoroethylene-hydrocarbon vinyl ether copolymers, polychlorotrifluoroethylene, ethylene-chlorotrifluoroethylene copolymers, polyvinyl fluoride, polyvinylidene fluoride (PVDF), vinylidene fluoride-hexafluoropropylene copolymers, fluorinated (meth)acrylate resins, 2-fluoroacrylate resins, fluorinated epoxy resins, fluorinated epoxy(meth) acrylate resins, fluorinated polyether resins, fluorinated polyimide resins, fluorinated polyester resins, fluorinated polyamide resins, fluorinated polycarbonate resins, fluorinated polyformal resins, fluorinated polyketone resins, fluorinated polyazomethine resins, fluorinated polyazole resins, fluorinated polyallyloxysilane resins, vinylidene fluoride-hexafluoropropylene fluoroelastomer, vinylidene fluoride-tetrafluoroethylene fluoroelastomer, tetrafluoroethylene-perfluoroalkyl vinyl ether fluoroelastomer, vinylidene fluoride-tetrafluoroethylene-hexafluoropropylene fluoroelastomer, vinylidene fluoride-tetrafluoroethylene-perfluoroalkyl vinyl ether fluoroelastomer, tetrafluoroethylene-perfluoroalkyl vinyl ether fluoroelastomer, propylene-tetrafluoroethylene fluoroelastomer, fluorosilicone rubber, fluorinated phosphazene rubber, fluorinated thermoplastic rubbers, flexible fluorocarbon resins, and mixtures thereof;
      ii) mixing the first binder with triethyl phosphate as a polar organic solvent to thereby provide a first binder mixture;
      iii) mixing a butadiene rubber with toluene as a non-polar organic solvent to form a second binder mixture;
      iv) mixing the first binder mixture with the second binder mixture to form a binder slurry;
   d) combining the cathode active material with the binder slurry to form a cathode active slurry;
   e) coating the cathode active slurry onto at least one side of a conductive substrate to form a cathode structure;
   f) drying the cathode structure to form the cathode;
   g) providing a separator intermediate the anode and the cathode in electrical association with each other to form an electrode assembly;
   h) housing the electrode assembly inside a casing with the anode connected to an anode terminal and the conductive substrate of the cathode connected to a cathode terminal;
   i) activating the electrode assembly housed in the casing with an electrolyte; and
   j) closing the casing.

2. The method of claim 1 including providing the first binder in a powdered form.

3. The method of claim 1 including providing the butadiene rubber as a styrene butadiene rubber.

4. The method of claim 1 including providing the first binder and the second binder in the binder slurry in a ratio of, by weight, about 1:99 to about 99:1.

5. The method of claim 1 including providing the first binder and the second binder in the binder slurry in a ratio of, by weight, about 40:60 to about 60:40.

6. The method of claim 1 including selecting the conductive substrate from the group consisting of titanium, aluminum, nickel, stainless steel, and copper.

7. The method of claim 1 including connecting the conductive substrate to a terminal lead by ultrasonic welding.

8. The method of claim 7 including providing the terminal lead being either a terminal pin or a casing for the cell.

9. The method of claim 1 including coating the electrode active slurry on the conductive substrate to a thickness of about 0.01 inches (0.254 mm) to about 0.05 inches (1.27 mm).

10. The method of claim 1 including coating the electrode active slurry on the conductive substrate using a metering roller.

11. The method of claim 1 including coating the electrode active slurry on the conductive substrate using a doctor blade.

12. The method of claim 1 including coating the electrode active slurry on the conductive substrate using a knife over roll technique.

13. The method of claim 1 including drying the electrode structure at a temperature of at least 100° C.

14. The method of claim 1 including first coating the cathode active slurry onto one side of the conductive substrate followed by a first drying step and then coating the cathode active slurry onto the other side of the conductive substrate followed by a second drying step.

15. An electrochemical cell, which comprises:
    a) a casing;
    b) an anode of an anode active material;
    c) a cathode of a cathode active material selected from the group consisting of:
        i) a first electrode active material having the general formula $SM_xV_2O_y$, wherein SM is a metal selected from Groups IB to VIIB and VIII of the Periodic Table of Elements, and wherein x is about 0.30 to 2.0 and y is about 4.5 to 6.0 in the general formula; and
        ii) a second electrode active material having the general formula $Cu_xAg_yV_2O_z$, wherein about $0.01 \leq x \leq 1.0$, about $0.01 \leq y \leq 1.0$ and about $5.01 \leq z \leq 6.5$; and
    d) wherein the cathode is characterized as having been formed by the process of:
        i) mixing polyvinylidene fluoride (PVDF) as a first binder with triethyl phosphate as a polar organic solvent to thereby provide a first binder mixture;
        ii) mixing a butadiene styrene as a second binder with toluene as a non-polar organic solvent to form a second, binder mixture;
        iii) mixing the first binder mixture with the second binder mixture to form a binder slurry;
        iv) mixing the cathode active material with the binder slurry to form a cathode active slurry having the first and second binders uniformly coating the cathode active material;
        v) coating the cathode active slurry onto at least one side of a conductive substrate to form a cathode structure; and
        vi) drying the cathode structure to form the cathode;
    e) a separator disposed between the anode and the cathode to prevent direct physical contact between them housed inside the casing; and
    f) an electrolyte activating the anode and the cathode.

16. The electrochemical cell of claim 15 wherein the butadiene rubber is a styrene butadiene rubber.

17. The electrochemical cell of claim 15 wherein the anode is of an alkali metal as the anode active material.

18. The electrochemical cell of claim 15 wherein the ratio of the first hinder to the second binder is, by weight, about 1:99 to about 99:1.

19. The electrochemical cell of claim 15 wherein the ratio of the first binder to the second binder is, by weight, about 40:60 to about 60:40.

20. The method of claim 1 including mixing the first binder with the first solvent, at a shear rate of about 400 RPM for from about 5 minutes to 15 minutes to form the first binder mixture.

21. The method of claim 1 including mixing the second binder with the second solvent at a first shear rate of about 400 RPM for from about 5 minutes to 15 minutes followed by a second shear rate of about 700 RPM for about 20 minutes to form the second binder mixture.

22. The method of claim 1 including providing the binder slurry comprising 5% PVDF/5% SBR, by weight, in a solvent mixture having a volume ratio of 1:10 toluene as the first solvent and triethyl phosphate as the second solvent.

23. The method of claim 1 including mixing PVDF in triethyl phosphate to form the first binder mixture and styrene butadiene rubber with toluene to form the second binder mixture.

24. A method for providing an electrochemical cell, comprising the steps of:
    a) providing an anode of an anode active material;
    b) providing a cathode of a cathode active material;
    c) providing a binder mixture, comprising the steps of:
        i) mixing polyvinylidene fluoride (PVDF) as a first binder with triethyl phosphate as a polar organic solvent to thereby provide a first binder mixture;
        ii) mixing a butadiene styrene as a second binder with toluene as a non-polar organic solvent to form a second binder mixture;
        iii) mixing the first binder mixture with the second binder mixture to form a binder slurry;
    d) mixing at least one of the anode active material and the cathode active material with the binder slurry to form an electrode active slurry;
    e) coating the electrode active slurry onto at least one side of a conductive substrate to form at least one of an anode structure and a cathode structure;
    f) drying the at least one of the anode structure and the cathode structure to form at least one of an anode and a cathode;
    g) providing a separator intermediate the anode and the cathode in electrical association with each other to form an electrode assembly;
    h) housing the electrode assembly-inside a casing with the anode connected to an anode terminal and the cathode connected to a cathode terminal;
    i) activating the electrode assembly housed in the casing with an electrolyte; and
    j) closing the casing.

25. The method of claim 24 including selecting cathode active material from the group consisting of silver vanadium oxide, manganese dioxide, copper vanadium oxide, titanium disulfide, copper oxide, copper sulfide, iron sulfide, iron disulfide, fluorinated carbon, carbon, $LiNiO_2$, $LiMn_2O_4$, $LiCoO_2$, $LiCo_{0.92}Sn_{0.08}O_2$, $LiCo_{1-x}Ni_xO_2$, and mixtures thereof.

26. The method of claim 25 including selecting the silver vanadium oxide as a material of the general formula $SM_xV_2O_y$, wherein SM is a metal selected from Groups IB to VIIB and VIII of the Periodic Table of Elements, and wherein x is about 0.30 to 2.0 and y is about 4.5 to 6.0 in the general formula.

27. The method of claim 24 including selecting the anode active material from the group consisting of coke, graphite, acetylene black, carbon black.

28. The method of claim 24 including providing the binder slurry comprising 5% PVDF/5% SBR, by weight, in a solvent mixture having a volume ratio of 1:10 toluene as the first solvent and triethyl phosphate as the second solvent.

29. The method of claim 24 including mixing the first binder with the first solvent at a first shear rate of about 400 RPM for from about 5 minutes to 15 minutes to form the first binder mixture and mixing the second binder with the second solvent at a second shear rate of about 400 RPM for from about 5 minutes to 15 minutes followed by a third shear rate of about 700 RPM for about 20 minutes to form the second binder mixture.

* * * * *

UNITED STATES PATENT AND TRADEMARK OFFICE
CERTIFICATE OF CORRECTION

| | | |
|---|---|---|
| PATENT NO. | : 8,906,549 B1 | Page 1 of 1 |
| APPLICATION NO. | : 13/241508 | |
| DATED | : December 9, 2014 | |
| INVENTOR(S) | : Marcus Palazzo | |

It is certified that error appears in the above-identified patent and that said Letters Patent is hereby corrected as shown below:

In the Claims

Column 11, line 59 (Claim 1, line 16) after the words "consisting of" insert --polytetrafluoroethylene, modified polytetrafluoroethylene, polyhexafluoropropylene, tetrafluoroethylene-hexafluoropropylene copolymers,--

Column 11, line 61 (Claim 1, line 18) after "polytrifluoroethylene," insert --ethylene-tetrafluoroethylene copolymers,--

Signed and Sealed this
Twenty-fourth Day of March, 2015

Michelle K. Lee
*Director of the United States Patent and Trademark Office*